US012602382B2

(12) United States Patent
Thomas et al.

(10) Patent No.: US 12,602,382 B2
(45) Date of Patent: Apr. 14, 2026

(54) RESOURCE AWARE QUERY PLANNING

(71) Applicant: INTERNATIONAL BUSINESS MACHINES CORPORATION, Armonk, NY (US)

(72) Inventors: Binoy Thomas, Kozhikode (IN); Sudheesh S. Kairali, Kozhikode (IN); Sarbajit Kumar Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/805,752

(22) Filed: Aug. 15, 2024

(65) Prior Publication Data

US 2026/0050596 A1 Feb. 19, 2026

(51) Int. Cl.
*G06F 16/2453* (2019.01)

(52) U.S. Cl.
CPC .............................. *G06F 16/24545* (2019.01)

(58) Field of Classification Search
CPC .................................................. G06F 16/2454
USPC ............................................................ 707/718
See application file for complete search history.

(56) References Cited

U.S. PATENT DOCUMENTS

| | | | |
|---|---|---|---|
| 11,347,761 | B1 | 5/2022 | Murthy et al. |
| 11,514,032 | B2 | 11/2022 | Tiyyagura et al. |
| 11,727,004 | B2 * | 8/2023 | Li ............................ G06N 5/04 |
| | | | 707/720 |

| | | | |
|---|---|---|---|
| 2013/0318069 | A1 * | 11/2013 | Alu ................... G06F 16/24524 |
| | | | 707/718 |
| 2016/0328273 | A1 * | 11/2016 | Molka ...................... A61B 8/00 |
| 2020/0065303 | A1 | 2/2020 | Bhattacharjee et al. |

(Continued)

FOREIGN PATENT DOCUMENTS

CN 115718773 A 2/2023

OTHER PUBLICATIONS

Tok, Wee Hyong et al., "dbRouter—A Scaleable and Distributed Query Optimization and Processing Framework," DEXA 2002, LNCS 2453, Sep. 2002, pp. 658-668.

(Continued)

*Primary Examiner* — Robert W Beausoliel, Jr.
*Assistant Examiner* — Lauren Zannah Ganger
(74) *Attorney, Agent, or Firm* — Lily Neff, Esq.; Heslin Rothenberg Farley & Mesiti P.C.; George S. Blasiak, Esq.

(57) ABSTRACT

Methods, computer program products, and systems are presented. The method computer program products, and systems can include, for instance: receiving, by a database management system, a database query, wherein the database management system is in communication with a plurality of data sources including a first data source and a second data source, wherein the first data source includes a first database of a first database technology hosted on a first computing node, and wherein the second data source includes a second database of a second database technology hosted on a second computing node; generating a query execution plan in response to the receiving the database query, wherein the generating includes performing the generating in dependence on prediction data returned responsively to applying model prompting data to a trained predictive model trained to predict computing resource availability of the first computing node and the second computing node.

20 Claims, 7 Drawing Sheets

(56) References Cited

U.S. PATENT DOCUMENTS

| | | | |
|---|---|---|---|
| 2020/0073987 A1* | 3/2020 | Perumala | G06F 16/24545 |
| 2022/0121662 A1* | 4/2022 | Liu | G06F 16/248 |
| 2023/0072930 A1 | 3/2023 | Shah et al. | |

OTHER PUBLICATIONS

Stokes, Kiersten, "An Introduction to Presto, A Query Engine That Powers watsonx.data," Sep. 2023, pp. 1-7.
Sumner, Stephen et al., "Recommendations for Optimizing Scaling and Partitioning," https://learn.microsoft.com/en-us/azure/well-architected/performance-efficiency/scale-partitio, Nov. 2023, pp. 1-15.
Batarfi et al., "A distributed query execution engine of big attributed graphs", SpringerPlus, May 23, 2016, 26 pages, vol. 5, No. 665, doi: https://doi.org/10.1186/s40064-016-2251-0.

* cited by examiner

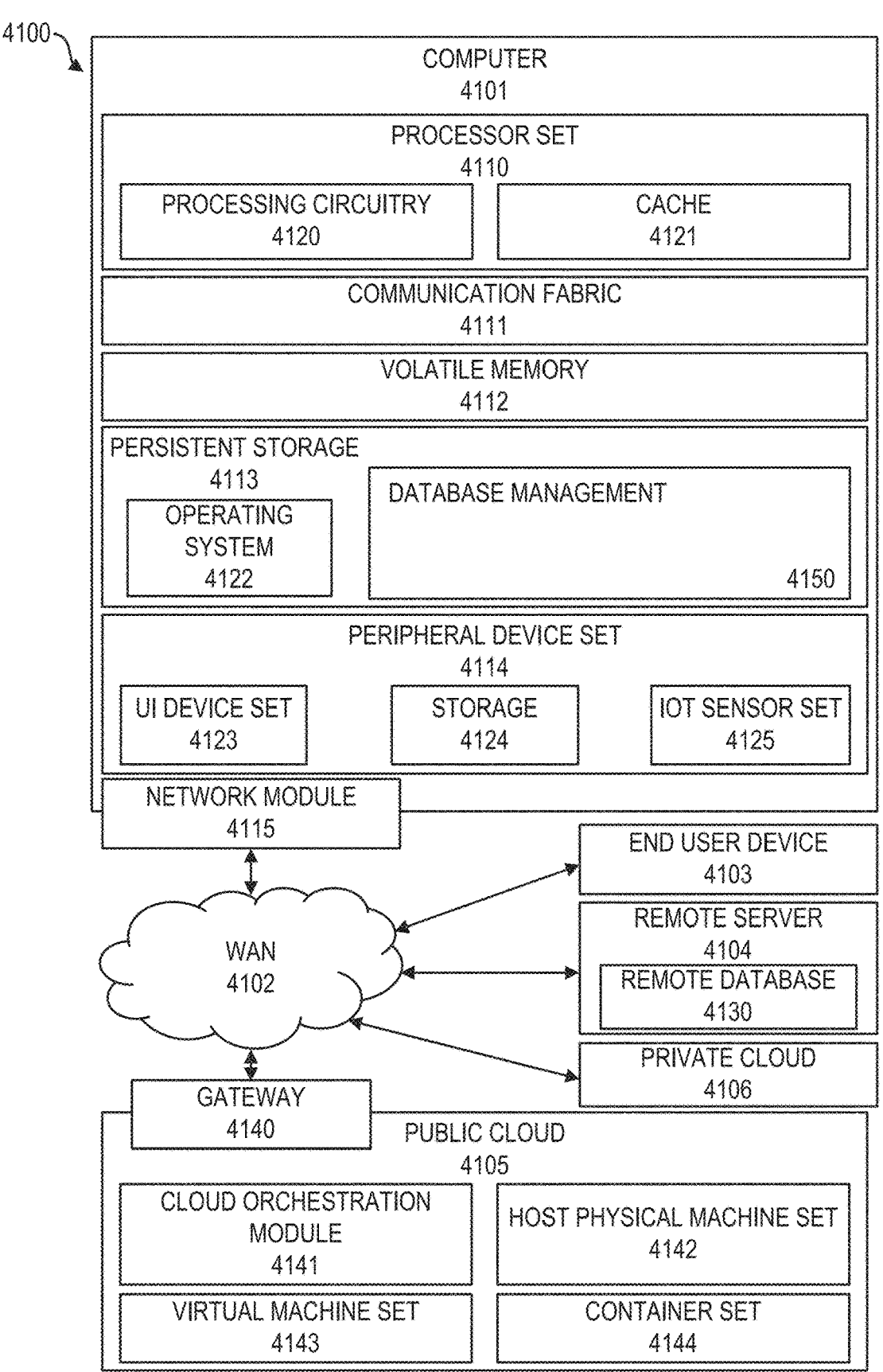

4100

COMPUTER
4101

PROCESSOR SET
4110

PROCESSING CIRCUITRY
4120

CACHE
4121

COMMUNICATION FABRIC
4111

VOLATILE MEMORY
4112

PERSISTENT STORAGE
4113

OPERATING SYSTEM
4122

DATABASE MANAGEMENT
4150

PERIPHERAL DEVICE SET
4114

UI DEVICE SET
4123

STORAGE
4124

IOT SENSOR SET
4125

NETWORK MODULE
4115

WAN
4102

END USER DEVICE
4103

REMOTE SERVER
4104

REMOTE DATABASE
4130

PRIVATE CLOUD
4106

GATEWAY
4140

PUBLIC CLOUD
4105

CLOUD ORCHESTRATION MODULE
4141

HOST PHYSICAL MACHINE SET
4142

VIRTUAL MACHINE SET
4143

CONTAINER SET
4144

FIG. 7

RESOURCE AWARE QUERY PLANNING

BACKGROUND

Embodiments herein relate generally to query planning and specifically to resource aware query planning.

A Database Management System (DBMS) can provide for creation, management, and use of databases. It provides a systematic way to store, retrieve, and manage data.

Data structures have been employed for improving operation of computer system. A data structure refers to an organization of data in a computer environment for improved computer system operation. Data structure types include containers, lists, stacks, queues, tables and graphs. Data structures have been employed for improved computer system operation e.g., in terms of algorithm efficiency, memory usage efficiency, maintainability, and reliability.

Artificial intelligence (AI) denotes the capability of machines to demonstrate intelligence. AI research encompasses endeavors such as search algorithms, mathematical optimization, neural networks, and probability analysis. AI solutions integrate insights from diverse scientific and technological domains including computer science, mathematics, psychology, linguistics, statistics, and neuroscience. Machine learning, commonly defined as the study enabling computers to learn without explicit programming, is regarded to be a significant aspect of AI.

SUMMARY

Shortcomings of the prior art are overcome, and additional advantages are provided, through the provision, in one aspect, of a method. The method can include, for example: receiving, by a database management system, a database query, wherein the database management system is in communication with a plurality of data sources including a first data source and a second data source, wherein the first data source includes a first database of a first database technology hosted on a first computing node, and wherein the second data source includes a second database of a second database technology hosted on a second computing node; generating a query execution plan in response to the receiving the database query, wherein the generating includes performing the generating in dependence on prediction data returned responsively to applying model prompting data to a trained predictive model trained to predict computing resource availability of the first computing node and the second computing node.

In another aspect, a computer program product can be provided. The computer program product can include a computer readable storage medium readable by one or more processing circuit and storing instructions for execution by one or more processor for performing a method. The method can include, for example: receiving, by a database management system, a database query, wherein the database management system is in communication with a plurality of data sources including a first data source and a second data source, wherein the first data source includes a first database of a first database technology hosted on a first computing node, and wherein the second data source includes a second database of a second database technology hosted on a second computing node; generating a query execution plan in response to the receiving the database query, wherein the generating includes performing the generating in dependence on prediction data returned responsively to applying model prompting data to a trained predictive model trained to predict computing resource availability of the first computing node and the second computing node.

In a further aspect, a system can be provided. The system can include, for example, a memory. In addition, the system can include one or more processors in communication with the memory. Further, the system can include program instructions executable by the one or more processors via the memory to perform a method. The method can include, for example: receiving, by a database management system, a database query, wherein the database management system is in communication with a plurality of data sources including a first data source and a second data source, wherein the first data source includes a first database of a first database technology hosted on a first computing node, and wherein the second data source includes a second database of a second database technology hosted on a second computing node; generating a query execution plan in response to the receiving the database query, wherein the generating includes performing the generating in dependence on prediction data returned responsively to applying model prompting data to a trained predictive model trained to predict computing resource availability of the first computing node and the second computing node.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 7 depicts a computing environment according to one embodiment.

DETAILED DESCRIPTION

Figure 1:
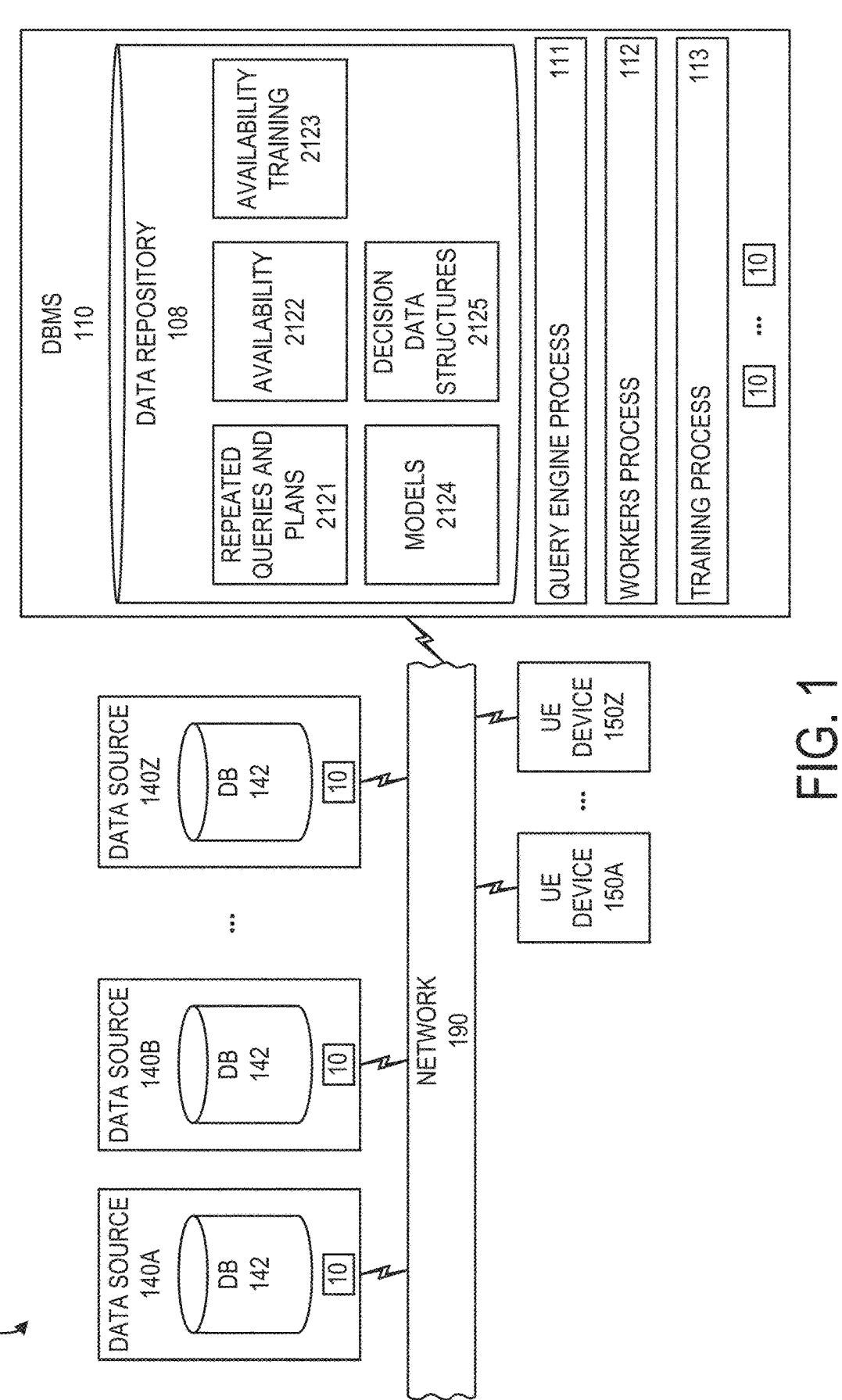
FIG. 1 is a schematic view of a system comprising a database management system DBMS, data sources, and user equipment UE devices according to one embodiment. embodiment.

System 100 for use in performing intelligent resource aware query processing is shown in FIG. 1. System 100 can include database management system (DBMS) 110 having an associated data repository 108, a plurality of data sources 140A-140Z, and user equipment devices UE devices 150A-150Z. DBMS 110 data sources 140A-140Z and UE devices 150A-150Z can be computing node based systems in communication with one another via network 190. Network 190 can be a physical network and/or a virtual network. A physical network can be, for example, a physical telecommunications network connecting numerous computing nodes or systems, such as computer servers and computer clients. A virtual network can, for example, combine numerous physical networks or parts thereof into a logical virtual network. In another example, numerous virtual networks can be defined over a single physical network. System 100 in one aspect can define a multiple data source database system.

DBMS 110 can be configured to manage the intake and processing of queries on a multiple data source database system, which can be provided by system 100. In one aspect, DBMS 110 can be configured to generate query plans for execution of queries in a manner that the query execution is resource aware. In one aspect, query plan generation can be resource aware in terms of predicted availability of computing resources associated to various respective data sources of data sources 140A-140Z. Further, processes 111 to 113 can be defined by one or more program running on one or more computing node 10 of DBMS 110.

Data repository 108 of DBMS 110 can store various data. Data sources 140A-140Z can respectively include a database 142 hosted on a computing node 10 which can be provided by physical computing node. Respective databases 142, e.g., can be hosted on respective computing nodes 10 configured as bare metal machines or can be hosted on computing nodes 10 via an intermediary of one or more virtual machine, e.g., a hypervisor-based virtual machine and/or container-based virtual machine.

In one aspect, respective databases 142 of the respective data sources 140A-140Z can be configured according to a variety of different database technologies. For example, the first database 142 of a first data source 140A can be configured as a relational database; a second database 142 of data sources 140A-140Z can be configured as an object database; and the third database 142 of the third data source of data sources 140A-140Z can be configured as an unstructured database. Samples of different database types can include, e.g., no SQL databases, relational databases, DBMS object-oriented databases, new SQL databases, timeseries databases, GraphQL based databases, unstructured databases, and in-memory databases.

Embodiments herein can collect computing resource availability data of system 100 and can use the collected availability data for training one or more predictive model. In generating a query execution plan, DBMS 110 can generate a query execution plan in dependence on result data resulting from query of the one or more trained predictive model with use of model prompting data.

Data repository 108 in repeated queries and plans area 2121 can store data that specifies queries ingested on a repeated basis by system 100 and query execution plans associated to such queries. In one aspect, DBMS 110 can cache query execution plans in repeated queries and plans area 2121. DBMS 110 can selectively pull such cached query execution plans cached in repeated queries and plans area 2121 for execution of select ones of incoming queries.

Data repository 108 in availability area 2122 can store data specifying availability of computing resources of system 100. Availability data stored in availability area 2122 can include, e.g., data on CPU availability of computing nodes 10 hosting respective ones of data sources 140A-140Z, data on working memory availability of computing nodes 10 hosting respective ones of data sources 140A-140Z, and bandwidth of network 190 through which DBMS 110 and data sources 140A-140Z communicate. Computing resource availability can specify, e.g., the degree to which computing resources such as CPU, working memory, storage memory, and network bandwidth are accessible and usable by processes when needed. CPU availability can refer to the proportion of CPU capacity that is free to be allocated to processes. Working memory availability can refer to the amount of RAM that is free and available for use by applications and processes. Storage memory availability can refer to the amount of disk space available for storing data, and network availability can refer to the bandwidth and connectivity that are available for data transmission over a network.

From time to time, data repository 108 in availability training data area 2123 can store recorded availability data set aside as training data for training one or more predictive model. DBMS 110, in one embodiment, can be configured to monitor execution of queries executed by one or more data source of data sources 140A-140Z. On the determination that a query has not been executed satisfactorily, DBMS 110 can pull data from availability area 2122 within a time window of the unsatisfactory query execution and store such pulled data into availability training data area 2123. DBMS 110 can train one or more predictive model using training data stored in availability training data area 2123. Embodiments herein recognize that a limited amount of availability data can be sufficient for training one or more predictive model for predicting computing resource availability. Selectively limited harvesting of training data can economize computing resource utilization of system 100.

Data repository 108 in models area 2124 can store one or more predictive model that has been trained with use of availability training data of availability training data area 2123. One or more predictive model stored in models area 2124 can be configured to predict computing resource availability of one or more computing node hosting respective ones of data sources 140A-140Z.

Data repository 108 in decision data structures area 2125 can store decision data structures for use in return of action decisions by DBMS 110. Decision data structures stored in decision data structures area 2125 can include, e.g., decision tables and decision trees.

DBMS 110 can run various processes. DBMS 110 running query engine process 111 can include DBMS 110 performing various functions that define a query engine capable of generating an execution plan for an incoming query. A query engine can enable efficient, distributed query processing by converting SQL queries into execution plans, optimizing them using cost-based and rule-based techniques, and breaking them down into smaller tasks for parallel execution across worker nodes. The defined query engine can interact with various data sources via connectors, allowing unified querying without data movement.

DBMS 110 running workers process 112 can perform a variety of functions that define a worker node in the multiple data source database system. A worker node executes tasks assigned by the query engine, processing specific portions of the query such as filtering, joining, aggregating, and data retrieval from sources like HDFS, S3, and databases. A worker node can handle intermediate data by shuffling it between nodes for operations requiring multiple data sets and performs local aggregations to minimize data transfer. Worker nodes can manage memory and CPU resources efficiently, retry failed tasks to ensure fault tolerance, and handle errors during execution. In another aspect, worker nodes can communicate with the coordinator for task assignments and progress updates, and exchange intermediate data with other worker nodes to ensure seamless query execution.

DBMS 110 running training process 113 can train one or more predictive model using availability training data stored in availability training data area 2123. On being trained, a trained predictive model trained by DBMS 110 running training process 113 can produce predictions as to availability of computing resources hosting respective ones of data sources 140A-140Z.

User equipment UE devices 150A-150Z can include UE devices defining clients that present queries for execution to DBMS 110 and can include UE devices of users of system 100 such as administrator users of system 100.

Figure 2:
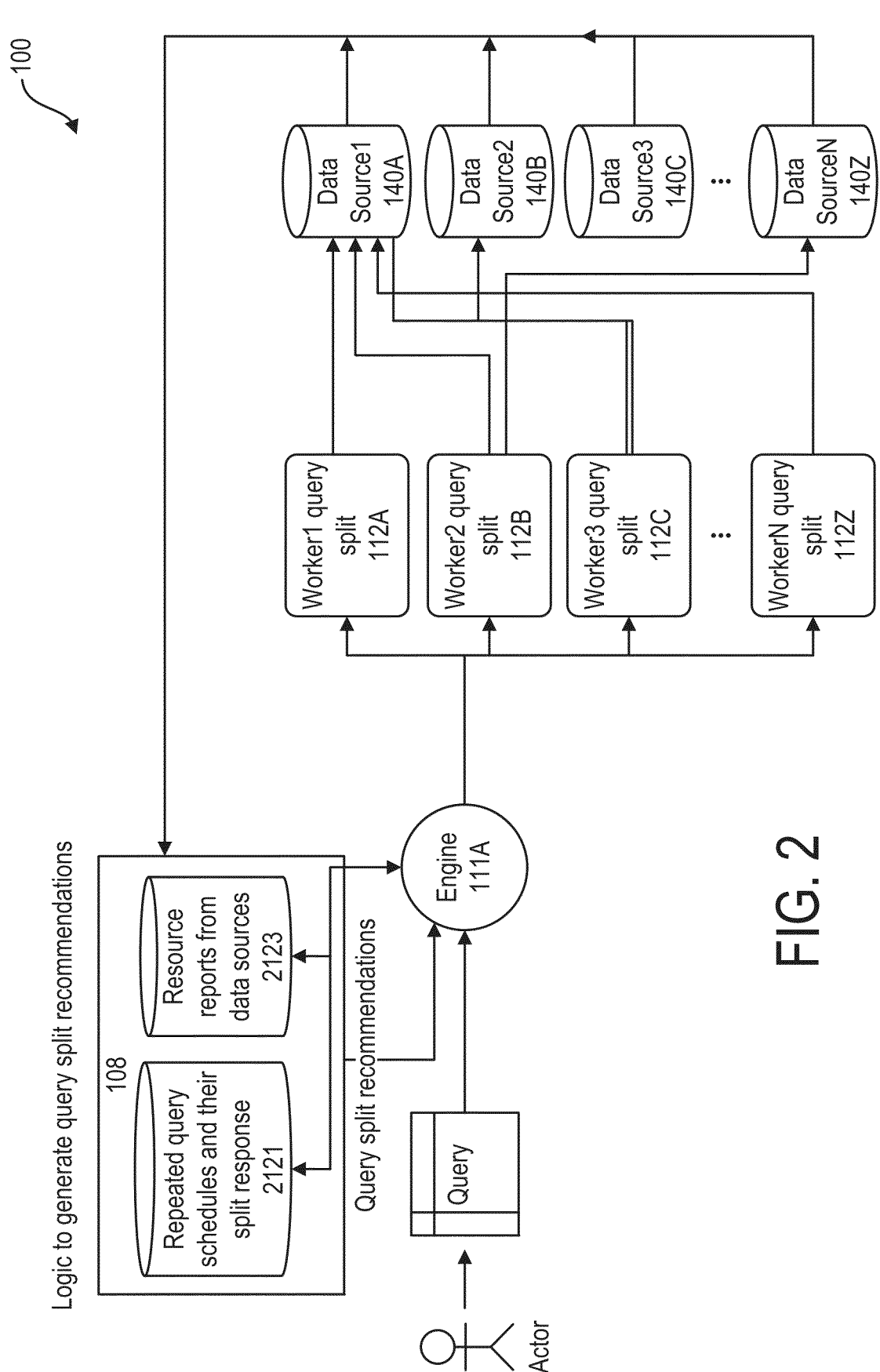
FIG. 2 is an alternative schematic view of the system of FIG. 1, according to one embodiment.

FIG. 2 is a schematic view of system 100, defining a multiple data source database system as shown in FIG. 2. System 100 as shown in FIG. 2 can include query engine 111A defined by running query engine process 111 explained with reference to FIG. 1, and further can include a plurality of workers 112A-112Z defined by the running of workers process 112 set forth in reference to FIG. 1.

Figure 3:
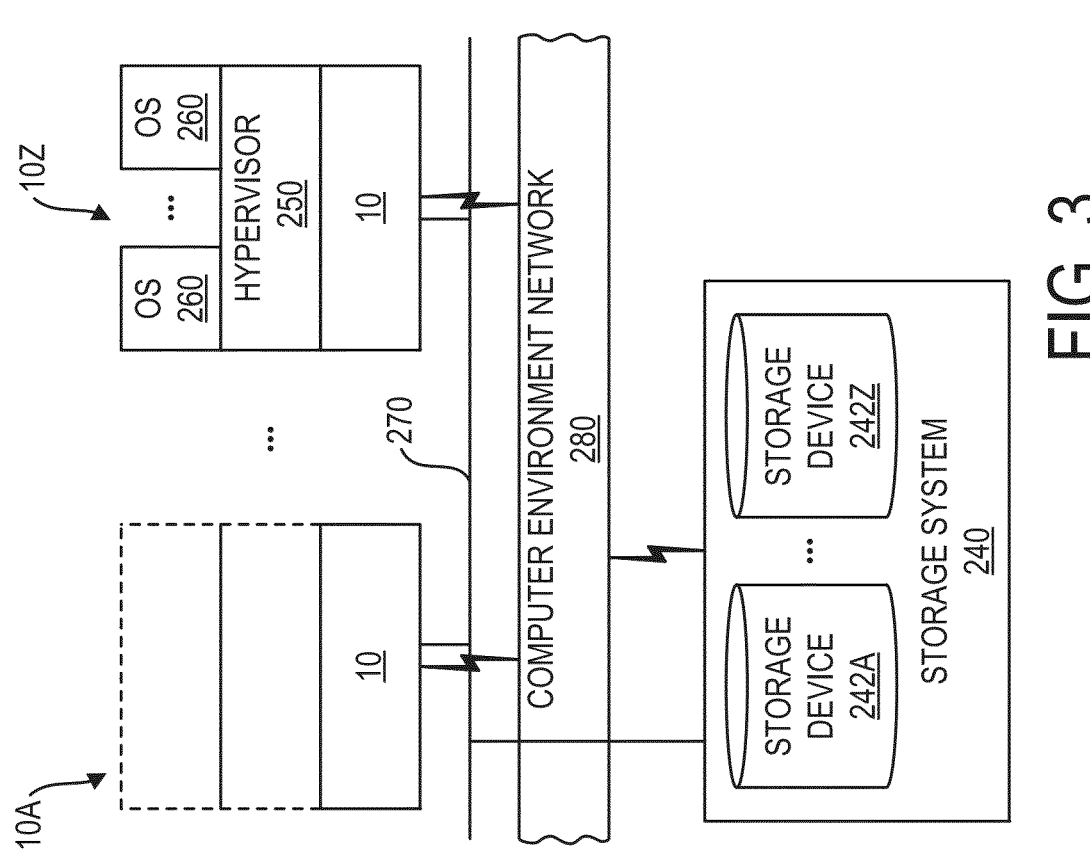
FIG. 3 depicts an example computer environment for hosting and defining the system of FIG. 1 and FIG. 2 according to one embodiment.

FIG. 3 depicts an example of a computer environment 200 defining and hosting system 100 which can be configured as a multiple data source database system. FIG. 3 depicts an example infrastructure defining a computer environment 200 for hosting and defining system 100 configured as a multiple data source database system. Computer environment 200 can include a plurality of computing nodes 10, which can be provided by physical computing nodes.

The respective computing nodes 10 can have software running thereon defining computing node stacks 10A-10Z. Software defining the respective instances of computing node stacks 10A-10Z can be differentiated between the computing node stacks, e.g., some stacks can provide traditional bare metal machine operation, other stacks can include a hypervisor 250 that supports a plurality of guest operating systems (OS) 260 defining respective guest hypervisor based virtual machines (VMs), other stacks can include container based VMs, e.g., running on top of a hypervisor based VM or running on a computing node stack that is absent of a hypervisor. A plurality of different configurations are possible. Software defining the respective instances of computing node stacks 10A-10Z can include application layer software which when run can perform various processes, e.g., processes 111-113 of DBMS 110.

Referring to further aspects of computer environment 200, computer environment 200 can include storage system 240. Storage system 240 can include storage devices 242A-242Z, which can be provided by physical storage devices. Physical storage devices of storage system 240 can include associated controllers defined by one or more computing node stack of computing node stacks 10A-10Z. Storage devices 242A-242Z can be provided, e.g., by hard disks and Solid-State Storage Devices (SSDs). Storage system 240 can be in communication with computing node stacks 10A-10Z by way of a Storage Area Network (SAN) and/or a Network Attached Storage (NAS) link. According to one embodiment, computer environment 200 can include fibre channel network 270 providing communication between respective computing node stacks 10A-10Z and storage system 240. Fibre channel network 270 can include a physical fibre channel that runs the fibre channel protocol to define a SAN. NAS access to storage system 240 can be provided by computer environment network 280 which can be an IP based network. Network 190 set forth in the logical system view of FIG. 1 can be defined by one or more of fibre channel network 270, and/or computer environment network 280. Computer environment 200 can be configured to provide cloud computing services. Computer environment 200 can be provided, e.g., by one or more data center.

In one embodiment, respective data sources 140A-140Z can map in infrastructure space to one or more storage device of storage devices 242A-242Z. Likewise, data repository 108 can map in infrastructure space to one or more storage device of storage devices 242A-242Z.

One or more database and/or one or more program hosted on one or more computing node 10 of DBMS 110 can be hosted on one or more computing node 10 configured as one or more bare metal machine, or alternatively, one or more database and/or one or more program can be hosted on one or more computing node 10 of DBMS 110 via an intermediary virtual machine, e.g., a hypervisor-based virtual machine and/or container-based virtual machine.

Figure 4:
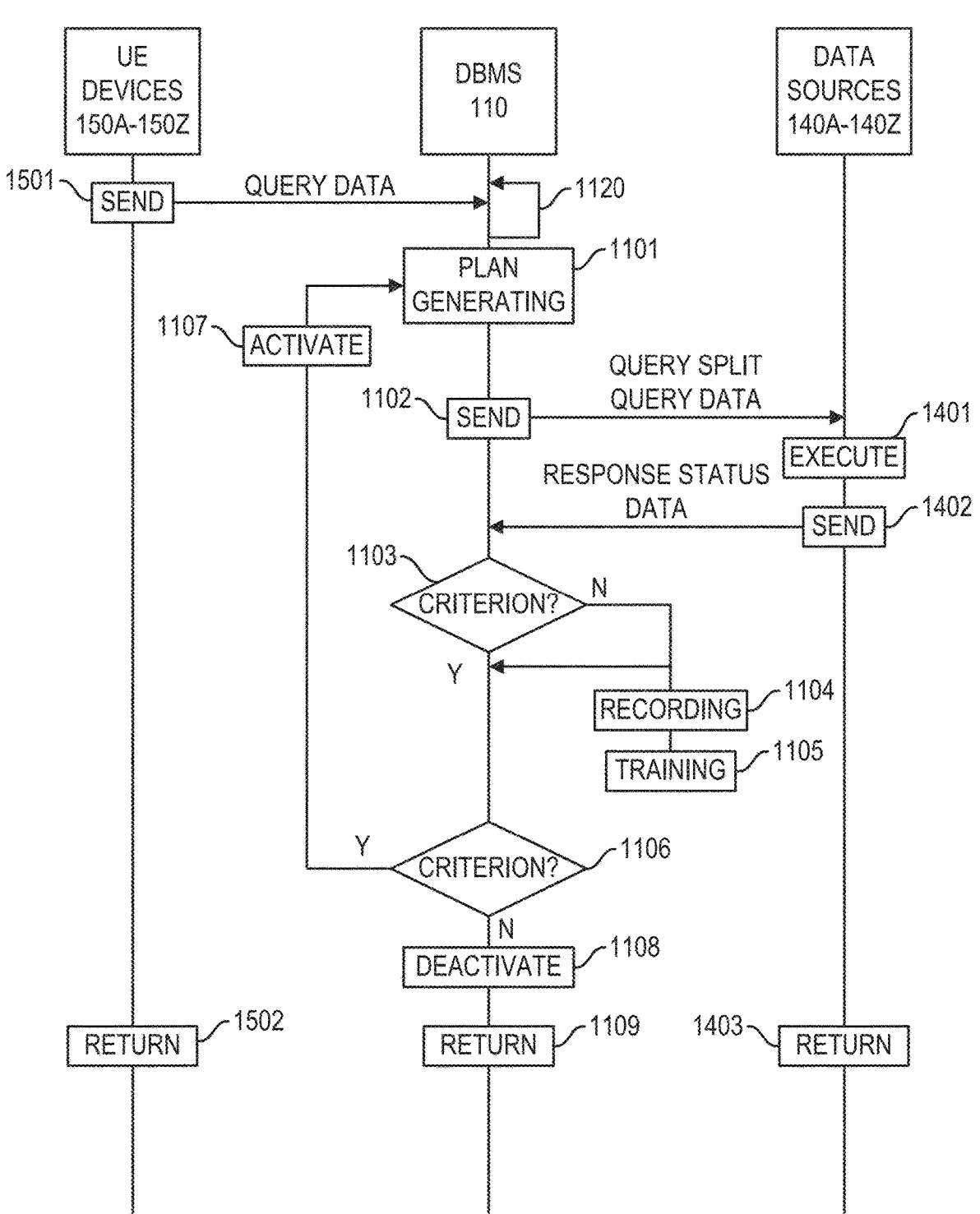
FIG. 4 is a flowchart depiction depicting a method for performance by a DBMS interoperating with UE devices and data sources according to one embodiment.

A method for performance by DBMS 110 interoperating with UE devices 150A-150Z, and data sources 140A-140Z is set forth in reference to the flowchart of FIG. 4.

At block 1501, UE devices 150A-150Z can be sending query data defining input queries to DBMS 110 at query engine 111A as shown in FIG. 2. In response to receipt of an input query, DBMS 110 can perform plan generating at block 1101. When creating a query execution plan, DBMS 110 can consider several factors to ensure efficient query execution. DBMS 110 can evaluate, e.g., data distribution and storage, including the location and partitioning of data, and can utilize available indexes to speed up retrieval. In one aspect, DBMS 110 can rely on statistics and histograms to understand data distribution and estimate selectivity. DBMS 110 can assess different join methods and orders to determine the most efficient way to join tables. The complexity of the query and specific predicates can be analyzed for optimization. Cost estimation models predict the computational resources and execution time required. DBMS 110 can identify opportunities for parallel execution and ensuring concurrency control.

Plan generating performed by DBMS 110 at plan generating block 1101 can include default plan generating or resource aware plan generating as set forth herein. Resource aware plan generating at plan generating block 1101 can be activated in response to a sensed condition. The sensed condition can be, e.g., that a trained predictive model as set forth herein is producing predictions as to resource availability of computing resources of system 100 according to a threshold satisfying level of accuracy. As indicated by return loop 1120, DBMS 110 can iteratively process query data received from UE devices 150A-150Z on an iterative basis and can iteratively pass incoming queries to plan generating block 1101.

On completion of plan generating block 1101, DBMS 110 can proceed to send block 1102. At send block 1102, DBMS 110 by workers 112A-112Z as shown in FIG. 2 can send query split data to selected ones of data sources of data sources 140A-140Z. In response to receipt of the query split query data, data sources 140A-140Z can perform query execution at block 1401.

On completion of execute block 1401, the respective selected ones of data sources 140A-140Z can proceed to send block 1402. At send block 1402, the selected ones of data sources 140A-140Z can send response status data received by DBMS 110. Response status data can include execution time status data, i.e., the time taken by the respective select ones of data sources 140A-140Z to execute the incoming query split query data.

Response status data sent at block 1402 can additionally or alternatively include messages or warnings generated during query execution such as errors of performance warnings. In response to the receipt of the response status data, DBMS 110 can proceed to criterion decision block 1103.

At criterion decision block 1103, DBMS 110 can ascertain whether, based on monitoring of the returned response status data sent at block 1402 an executed query executed at block 1401 has been executed according to a threshold satisfying level of performance. In the case that the monitored query execution has not been performed according to a threshold satisfying level of performance, e.g., the execution time has exceeded a threshold, DBMS 110 at criterion decision block 1103 can according to the 'no' branch of criterion block 1103 proceed to record block 1104.

At record block 1104, DBMS 110 can record availability data of computing resources defining system 100 in a time window of a detected unsatisfactory performance event detected at criterion block 1103. The time window can include the current time, and an historical time backwards from the current time (e.g., one minute prior to the current time or in some instances, a longer time, e.g., 10-minute, one hour, and the like) and a time period forward from the current time. For such processing (including time backwards data monitoring), DBMS 110 can mine timestamped data from availability area 2122 and can record selected time-stamped data from availability area 2122 into availability training data area 2123.

Availability data selectively harvested and recorded into availability training data area 2123 at recording block 1104 can include, e.g., data on CPU availability of computing nodes 10 hosting respective ones of data sources 140A-140Z, data on working memory availability of computing nodes 10 hosting respective ones of data sources 140A-140Z, and bandwidth of network 190 through which DBMS 110 and data sources 140A-40Z communicate.

Computing resource availability can specify, e.g., the degree to which computing resources such as CPU, working memory, storage memory, and network bandwidth are accessible and usable by processes when needed. CPU availability can refer to the proportion of CPU capacity that is free to be allocated to processes. Working memory availability can refer to the amount of RAM that is free and available for use by applications and processes. Storage memory availability can refer to the amount of disk space available for storing data, and network availability can refer to the bandwidth and connectivity that are available for data transmission over a network.

Figure 5:
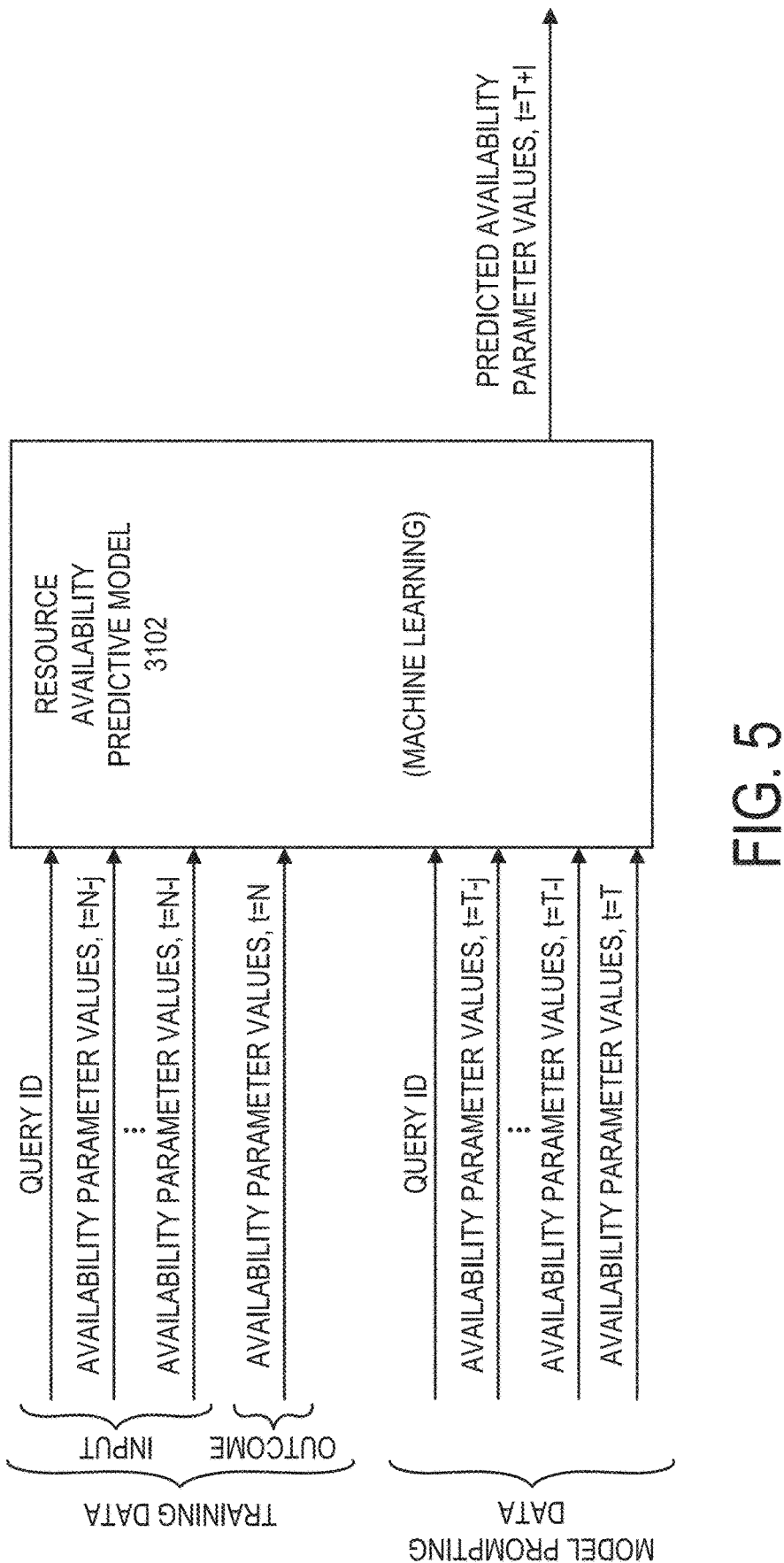
FIG. 5 depicts resource availability predictive model, according to one embodiment.

On completion of recording block 1104, DBMS 110 can proceed to training block 1105. At training block 1105, DBMS 110 can perform training of one or more predictive model, wherein the one or more predictive model, once trained, can predict computing resource availability of resources defining multiple data source database system 100. An example of a predictive model for predicting computing resource availability is shown in FIG. 5.

Resource availability predictive model 3102 can be trained with iterations of training data and once trained can be configured to predict computing resources availability of respective computing nodes hosting respective ones of data sources 140A-140Z. Iterations of training data for training resource availability predictive model 3102 can include input training data and outcome training data. Input training data defining iterations of training data can include, e.g., a query ID identifying an historical incoming database query, availability parameter values of system 100 at time t=N−1, and availability parameter values of system 100 at one or more times prior to time t=N−1, e.g., back to the time window commencement time of t=N−J.

Outcome data defining iteration of training data for training resource availability predictive model 3102 can include availability parameter values of system 100 at time t=N.

Availability parameter values defining training data of system 100 can include, e.g., CPU and working memory availability parameter values of one or more computing node hosting respective ones of data sources 140A-140Z, CPU and working memory availability parameter values of from more computing node 10 hosting one or more running program defining processes 111 to 113 as shown in FIG. 1, and/or network availability parameter values associated to a network 190. For each new iteration of training data for training predictive model 3102, N can advance by '1' time unit.

Trained as described, resource availability predictive model 3102 is able to predict trends and resource availability of resources defining system 100 over time. Resource availability predictive model 3102 can output predictions specifying, e.g., CPU and working memory availability of one or more computing node 10 hosting respective ones of data sources 140A-140Z.

Resource availability predictive model 3102, once trained, can be configured to be responsive to query data defined by model prompting data. Model prompting data for prompting resource availability predictive model 3102 can include, e.g., query data query ID specifying an identifier of an incoming query resource availability parameter values of system 100 at the current time t=T, resource availability parameter values at system 100 at the prior time relative to the current time, i.e., t=T−1, and one or more prior historical availability parameter values, sets of availability parameter values tracing backward in time from the current time to time t=T−J. Queried as described, resource availability predictive model 3102 can output predicted availability parameter values at a next time period, i.e., t=T+1.

In one embodiment, DBMS 110 can train multiple instances of predictive model 3102, each instance having different time granularity. For example, the first instance in a first instance of resource of availability predictive model 3102 the time unit of '1' can refer to a first unit of time, i.e., '1' equals one second and the time units can vary between instances of resource availability predictive model 3102. For a first instance of resource availability predictive model 3102, the time t=T−1 can refer to one second before the prior time before the current time, second instance the time t=T−1 can refer to 10 seconds prior to the current time, and the third instance can refer to one minute prior to the current time and in yet another instance can refer to the time one hour prior to the current time, and so on. By providing multiple instance of resource availability predictive model 3102, system 100 is able to return predictions to resource availability at variations in relevant time period. A first instance of resource availability predictive model 3102 can be configured for relatively shorter-term resource availability predictions and another instance of resource availability predictive model 3102 can be configured to provide relatively longer-term resource availability predictions.

On the determination at criterion block 1103 that execution of a query data defined by a query split was satisfactory, i.e., a performance threshold was satisfied, DBMS 110 can proceed to criterion block 1106. Further, it is seen that even where a 'no' decision returned block 1103, DBMS 110 can nevertheless proceed to criterion block 1106.

At criterion block 1106, DBMS 110 can ascertain whether one or more trained predictive model 3102 is producing predictions with the threshold satisfying level of accuracy. For ascertaining whether resource availability predictive model 3102 is producing predictions featuring a threshold level of accuracy, DBMS 110 can query resource availability predictive model 3102 with resource availability query data timed prior to but proximate the current time and can compare predicted resource availability output by resource availability predictive model 3102 to actual recorded availability parameter values. For example, DBMS 110 can query resource availability predictive model 3102 using availability parameter values from time $t=T-3$, $t=T-2$ and time $t=T-1$, and can compare the output predictions output by resource availability predictive model 3102 to the actual availability parameter values recorded in availability area 2122 for the current time $t=T$.

On determining that one or more resource availability predictive model 3102 is producing predictions exhibiting threshold satisfying level of accuracy, DBMS 110 can proceed to 'yes' branch and execute activate block 1107.

At activate block 1107, DBMS 110 can activate resource aware plan generating so that resource aware plan generating is active at a next iteration of plan generating block 1101. For performance of resource aware plan generating at plan generating block 1101, DBMS 110 in one aspect can query resource availability predictive model 3102 for determination for predicting resource availability parameter values of system 100 and can generate a query execution plan in dependence on one or more parameter value of the predicted resource availability parameter values.

On determination by DBMS 110 at criterion block 1106 that one or more resource availability predictive model 3102 is not returning predictions featuring a threshold satisfying level of accuracy, DBMS 110 can proceed to deactivate block 1108. At deactivate block 1108, DBMS 110 can deactivate resource aware plan generating by DBMS 110 at plan generating block 1101. When resource aware plan generating has been deactivated, DBMS 110 at plan generating block 1101 can return to performing default plan generating.

On completion of deactivate block 1108, DBMS 110 can proceed to return block 1109. At return block 1109, DBMS 110 can return to a stage preceding block 1101. DBMS 110 can iteratively perform the stages of block 1101-1109 for deployment period of DBMS 110.

UE devices 150A-150Z on completion of send block 1501 can proceed to return block 1502. At return block 1502, UE devices can return to a stage prior to block 1501. UE devices 150A-150Z can iteratively perform the loop of blocks 1501 to 1502 for deployment period of UE devices 150A-150Z. Data sources 140A-140Z on completion of send block 1402 can proceed to return block 1403. At return block 1403, data sources 140A-140Z can return to a stage preceding execute block 1401.

Data sources 140A-140Z can iteratively perform the loop of blocks 1401-1403 for deployment period of the data sources 140A-140Z.

It is noted that when resource aware query plan generating is activated, DBMS 110 can perform query plan generating at plan generating block 1101 on a resource aware basis in dependence on predicted availability of computing resources defining system 100.

In one aspect of performing resource aware data execution plan generating, DBMS 110 can employ the decision data structure of Table A which can be stored in decision data structures area 2125. According to the decision data structure of Table A, DBMS 110 can either qualify an incoming query for immediate execution or alternatively can determine that query execution should be delayed.

TABLE A

| Row | Condition | Action decision |
|---|---|---|
| 1 | Fewer than M % of data sources 140A-140Z are predicted to be overloaded at next time period, meaning M % or greater of data sources 140A-140Z are predicted to have a threshold satisfying level of availability at the next time period. | Execute query without delay |
| 2 | M % or more of data sources 140A-140Z are predicted to be overloaded at next time period, meaning less than M % of data sources 140A-140Z are predicted to have a threshold satisfying level of availability at the next time period. . | Delay execution of query |

According to the decision data structure of Table A, DBMS 110 can return an action decision to immediately execute the query on the condition that the threshold satisfying percentage (and therefore count (number)) of data sources of data sources 140A-140Z are predicted to have threshold satisfying levels of availability at a next time period. Conversely, according to the decision to update data structure of Table A, DBMS 110 can return the action decision to delay execution of an incoming query where a threshold percentage (and therefore count (number) of) data sources of data sources 140A-140Z are predicted to have less than a threshold satisfying level of availability at a next time period. In one aspect, DBMS 110 can delay execution of a database query and can schedule execution of a database query at a future time where the database query can be accommodated in accordance with predicted availability of various computing nodes hosting respective data sources. For determining an open time window at which a threshold percentage of respective computing nodes 10 hosting respective data sources 140A-140Z are predicted to have threshold satisfying availability such that the database query can be accommodated, DBMS 110 can send model prompting data to one or more instance of resource availability predictive model 3102 for return of predicted availability data indicating the open time window. In one embodiment, DBMS 110 can send model prompting data to multiple instances of resource availability predictive model 3102 trained as set forth herein with multiple levels of time granularity for return of predicted availability data indicating the open time window.

In another aspect, DBMS 110, with resource aware query execution plan generating activated at plan generating block 1101, can perform query execution plan generating with use of the decision data structure of Table B.

TABLE B

| Row | Overall predicted availability of computing node hosting data source | Predicted working memory availability of computing node hosting data source | Action decision |
|---|---|---|---|
| 1 | 'High', based on overall (in dependence on weighted contributions from predicted CPU, working memory, and storage memory) predicted | 'High', based on the predictive working memory availability satisfying the threshold thm = THM | Execute query without delay |

TABLE B-continued

| Row | Overall predicted availability of computing node hosting data source | Predicted working memory availability of computing node hosting data source | Action decision |
|---|---|---|---|
| | availability satisfying the threshold tho = THO | | |
| 2 | 'Low', based on overall (in dependence on weighted contributions from predicted CPU, working memory, and storage memory) predicted availability not satisfying the threshold tho = THO | 'High', based on the predictive working memory availability satisfying the threshold thm = THM | Cache query split |
| 3 | 'Low', based on overall (in dependence on weighted contributions from predicted CPU, working memory, and storage memory) predicted availability not satisfying the threshold tho = THO | 'Low', based on the predictive working memory availability not satisfying the threshold thm = THM | Disqualify data source |

Referring to the decision data structure of Table B, DBMS 110 (Row 2) can return an action decision to cache a split query in a cache memory of a certain data source of data sources 140A-140Z when the overall predicted availability of a computing node hosting the certain data source is predicted at a next time period to fail to satisfy an overall availability threshold and the predicted availability of the working memory of the computing node hosting the certain data source (supporting caching) is predicted to satisfy a high threshold of availability. On that condition (Row 2), DBMS 110 can return the action decision to cache query in the cache memory of computing node 10 hosting the certain data source based on resource availability of the cache memory satisfying threshold indicative of there being sufficient working memory to support the described caching.

On the other hand (Row 3), where the overall predicted resource availability of a certain computing node hosting the certain data source of data sources 140A-140B designated for receiving a query split fails to satisfy an overall availability threshold and the predicted availability of working memory of the computing node hosting the certain data source also fails to satisfy a low working memory threshold, DBMS 110 (Row 3) can return the action decision to disqualifying the particular data source from receiving a current split.

Accordingly, with action decisions rendered in accordance with decision data structures such as the decision data structures of Table A and Table B, DBMS 110 can adaptively relieve data sources of data sources 140A-140Z from loading to promote improved performance of data sources 110A-110Z, and the adapting can be dynamic in nature given that the process including blocks 1101-1109 iterates as new queries are received by DBMS 110.

System 100 can have multiple data sources such as RDBMS, edge node, object storage, and the like. In system 100 distributed queries can be executed as splits and hit multiple data sources. In general, the distributed query can be divided into query, stage, and task.

In one embodiment, a query can be divided into several stages which represents some collection of operators. In one embodiment, a query can be scheduled per stages and task refers to a unit of actual data processing. In a further aspect, a stage can include several tasks. In a further aspect, task can refer to a parallel unit among multiple workers.

Embodiments herein recognize that tasks in the same stage can be performing the same function but may operate on different target data and can have differentiated worker instances on which a task is running. Accordingly, when there are more tasks in a stage, it means more parallelism. Embodiments herein recognize that a split can be defined by a task for data scanning from connector, or other workers. It provides the data source processed by each drivers. In one aspect, a split can be responsible for handling I/O between other external system.

Embodiments herein recognize that when a query is split and targets multiple data sources, some of the sources may have a resource crunch or maintenance window. If the source is not able to respond, the joint query will fail. Embodiments herein can feature a data source resource configured to report its resource availability, which resource availability can be considered in split assignment of workers by system 100.

According to system 100 in one embodiment, a majority of queries can be repeated in nature. When a distributed query split hits a data sources, system 100 according to one embodiment can track failed or slow responding splits. From repeated query requests, a data source herein according to one embodiment can be configured to identify its resource utilization and frequency of the query.

In one embodiment, a data source herein can record all queries that it cannot respond in usual time. Embodiments herein recognize that unsatisfactory response can be due to multiple query splits hitting the source or the source handling another one or more request at the same time, e.g., query is hitting same time as data ingestion happening in the data source.

Based on historical query cycles, the data source can register and report the below statistics to system 100 as summarized in Table C.

TABLE C

CPU and memory trend and data specifying whether the output of each query in the past was varying based on these resources.
Quantity of data that the data source can service (data per second).
Network throughput.
When the source is busy due to other queries having priority, i.e., bulk data ingestion.
Unavailability pattern due to maintenance window, etc.

In one aspect, system 100 can maintain a data source resource availability pattern and can create a "query split recommendations" from its query split response history and from data source reports. In one embodiment, the number of splits can be proportionally increased or decreased based on variance of data source reports. In one example, system 100 can determined that when the working memory of data source 1 went down 50%, the query result took more time and the download per minute was reduced to 30%.

In one aspect, system 100 can decide a split or parallelism based on a percentage of availability of each target data source. If a data source informs a predicted demand in the data source based on the predicted resource crunch, system 100, using a query split recommendation can either reduce the volume of splits hitting the data source or cache similar results (selective enabling of cache).

In one illustrative use case, a first data source can service up to 10 GB per second and a second data source can service up to 100 GB per second. In such a use case, the second data source can be queried with more query splits than the first data source.

In one aspect, there can be an initial split size specified by a user. In one example, a user can specify 100 KB as a split size. In such an example, if a query needs to download 1 MB, ten splits can be performed. In one embodiment, system 100 can be configured to dynamically change a number of splits based on availability data.

From query split recommendations, system 100 can inform a data source of a predicted high query split, and a data source and responsively choose to auto scale and/or start optimizations for predicted time window.

System 100 can maintain a resource demand pattern of multiple data sources from their reports. Based on the resource demand pattern, system 100 can provide a query split recommendation with updated data source scale and optimization. Based on the query split recommendation, system 100 can create optimal splits for multiple data sources and can predict the correct number of splits.

If system 100 finds some data source is not able to handle a query for a predicted time, system 100 can recommend selectively enabling cache so the query join will not fail. Alternately, system 100 can recommend a suitable time window where all splits can be successful and based on these recommendations, a user can augment query time. The described action can avoid query retry which will load all data sources targeted with splits.

System 100 can maintain details of all regular queries such as query splits and their response. The expected data sources participating in system 100 will have the capabilities to track of resource utilization in responding to query splits and their frequency pattern.

Data sources of system 100 can report the resource utilization pattern, including, e.g., CPU and/or memory trend, data on output variance of each query over time, network throughput, data on when the source is busy due to other queries having priority, i.e., bulk data ingestion, unavailability pattern due to maintenance window, and the like.

In one aspect, system 100 can proportionally increase or decrease the number of splits based on variance of above factors. When a distributed query split hits a data source, system 100 keeps track of split query response and success status.

In one example, a user can specify an initial split size. A user, e.g., can specify 100 KB as a split size and if query needs to download 1 MB, 10 splits can be performed. Embodiments herein can vary a number of splits in dependence on sensed system conditions.

In one aspect, system 100 can have a learn phase (or collect statistical data). System 100 can create a query split recommendation. From the recommendation, a distributed query engine can discover that data source 1 can be handling other priority queries, so it and handle only one query split at max on every Saturday. System 100 can discover that data source 2 has backup and maintenance on first few hours in every Sunday, etc.

When performing query planning and splitting for a distributed query, system 100 can produce a query split recommendation. In one embodiment, a query engine can be configured to predict split queries based on reports from data sources. Data sources can also report future demands as a day of the month or week, etc.

If a data source informs a predicted demand in the data source, based on the predicted resource crunch, system 100 can either reduce the volume of splits hitting the source or cache similar results (selective enabling of cache). For example, if a data source can service up to 10 GB per second and a second data source can serve up to 100 GB per second, the second data source can be queried with more splits.

In one aspect, a system engine can inform a source of a predicted high number of query splits, and a data source may choose to auto scale and/or start optimizations for predicted time window. System 100 can update a query split recommendation with an updated data source scale and optimization. Based on a query split recommendations, system 100 can create optimal splits to multiple data sources.

If system 100 finds that some data source is not able to handle a query for a predicted time, it can recommend to selectively enable cache so the query join will not fail. System 100 can avoid query retry which will load all data sources targeted with splits. System 100 can recommend a suitable time window where all splits can be successful and based on these recommendations, user can augment query time.

Various available tools, libraries, and/or services can be utilized for implementation of trained predictive models herein trained by machine learning. For example, a machine learning service can provide access to libraries and executable code for support of machine learning functions. A machine learning service can provide access to a set of REST APIs that can be called from any programming language and that permit the integration of predictive analytics into any application. Enabled REST APIs can provide, e.g., retrieval of metadata for a given predictive model, deployment of models and management of deployed models, online deployment, scoring, batch deployment, stream deployment, monitoring and retraining deployed models. According to one possible implementation, a machine learning service can provide access to a set of REST APIs that can be called from any programming language and that permit the integration of predictive analytics into any application. Enabled REST APIs can provide, e.g., retrieval of metadata for a given predictive model, deployment of models and management of deployed models, online deployment, scoring, batch deployment, stream deployment, monitoring and retraining deployed models. Trained predictive models herein can employ use, e.g., of artificial neural networks (ANNs) support vector machines (SVM), Bayesian networks, regression based models, and/or other machine learning technologies.

Figure 6:
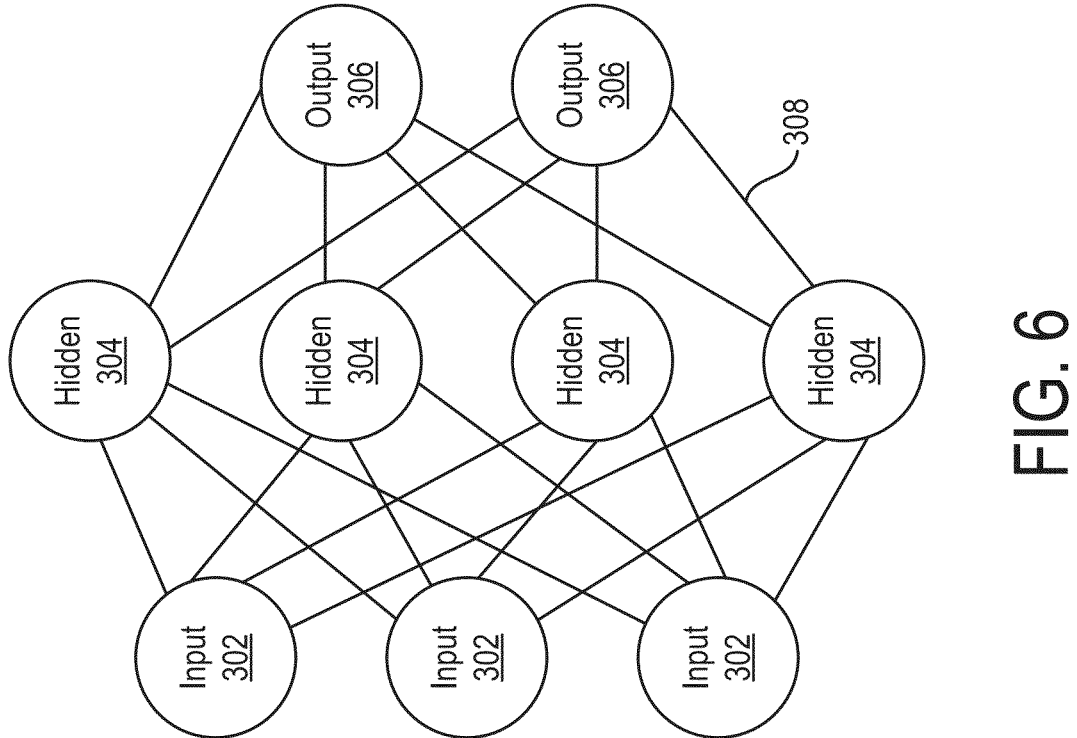
FIG. 6 depicts an artificial neural network (ANN) according to one embodiment.

FIG. 6 is an illustration of an example ANN architecture for trained predictive models herein.

One element of ANNs is the structure of the information processing system, which includes a large number of highly interconnected processing elements (called "neurons") working in parallel to solve specific problems. ANNs are furthermore trained using a set of training data, with learning that involves adjustments to weights that exist between the neurons.

Referring now to FIG. 6, a generalized diagram of a neural network is shown. Although a specific structure of an ANN is shown, having three layers and a set number of fully connected neurons, it should be understood that this is intended solely for the purpose of illustration. In practice, the present embodiments may take any appropriate form, including any number of layers and any pattern or patterns of connections therebetween.

ANNs demonstrate an ability to derive meaning from complicated or imprecise data and can be used to extract patterns and detect trends that are too complex to be detected by humans or other computer-based systems. The structure of a neural network is known generally to have input neurons 302 that provide information to one or more "hidden" neurons 304. Weighted connections 308 between the input neurons 302 and hidden neurons 304 are weighted, and these weighted inputs are then processed by the hidden neurons 304 according to some function in the hidden neurons 304. There can be any number of layers of hidden neurons 304, and as well as neurons that perform different functions. There exist different neural network structures as well, such as a convolutional neural network, a maxout network, etc., which may vary according to the structure and function of the hidden layers, as well as the pattern of weights between the layers. The individual layers may perform particular functions, and may include convolutional layers, pooling layers, fully connected layers, softmax layers, or any other appropriate type of neural network layer. Finally, a set of output neurons 306 accepts and processes weighted input from the last set of hidden neurons 304.

This represents a "feed-forward" computation, where information propagates from input neurons 302 to the output neurons 306. Upon completion of a feed-forward computation, the output is compared to a desired output available from training data. The error relative to the training data is then processed in "backpropagation" computation, where the hidden neurons 304 and input neurons 302 receive information regarding the error propagating backward from the output neurons 306. Once the backward error propagation has been completed, weight updates are performed, with the weighted connections 308 being updated to account for the received error. It should be noted that the three modes of operation, feed forward, back propagation, and weight update, do not overlap with one another. This represents just one variety of ANN computation, and that any appropriate form of computation may be used instead.

To train an ANN, training data can be divided into a training set and a testing set. The training data includes pairs of an input and a known output, which can be referred to as outcome training data as referenced in connection with predictive models herein. During training, the inputs of the training set are fed into the ANN using feed-forward propagation. After each input, the output of the ANN is compared to the respective known output. Discrepancies between the output of the ANN and the known output that is associated with that particular input are used to generate an error value, which may be backpropagated through the ANN, after which the weight values of the ANN may be updated. This process can continue until the pairs in the training set are exhausted.

After the training has been completed, the ANN may be tested against the testing set, to ensure that the training has not resulted in overfitting. If the ANN can generalize to new inputs, beyond those which it was already trained on, then it is ready for use. If the ANN does not accurately reproduce the known outputs of the testing set, then additional training data may be needed, or hyperparameters of the ANN may need to be adjusted.

ANNs may be implemented in software, hardware, or a combination of the two. For example, weights of weighted connections 308 may be characterized as a weight value that is stored in a computer memory, and the activation function of each neuron may be implemented by a computer processor. The weight value may store any appropriate data value, such as a real number, a binary value, or a value selected from a fixed number of possibilities, that is multiplied against the relevant neuron outputs. Alternatively, weights of weighted connections 308 may be implemented as resistive processing units (RPUs), generating a predictable current output when an input voltage is applied in accordance with a settable resistance.

Certain embodiments herein may offer various technical computing advantages involving computing advantages to address problems arising in the realm of computer systems. Embodiments herein can improve the performance of a multiple data source database system by predicting resource availability of computing resources of the system including availability of computing nodes hosting respective data sources of the system and adapting query execution planning in dependence on predicted availability of the computing resources. Embodiments herein can return various action decisions for improved performance, including improved resource economization of multiple data source database system such as computing nodes hosting respective data sources. In one aspect, embodiments herein can delay execution of a query and can schedule execution of a query at a future time where the query can be accommodated in accordance with predicted availability of various computing nodes hosting respective data sources. In another aspect, based on predicted availability of computing resources embodiments herein can cache a split query at a computing node hosting data source for later execution. In another aspect, embodiments herein can disqualify one or more data source for execution of a query split based on predicted availability of computing resources. Various decision data structures can be used to drive artificial intelligence (AI) decision making, such as decision data structures. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms. Embodiments herein can employ data structuring processes, e.g., processing for transforming unstructured data into a form optimized for computerized processing. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making. Certain embodiments may be implemented by use of a cloud platform/data center in various types including a Software-as-a-Service (SaaS), Platform-as-a-Service (PaaS), Database-as-a-Service (DBaaS), and combinations thereof based on types of subscription.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. The computer implemented method also includes receiving, by a database management system, a database query, where the database management system is in communication with a plurality of data sources including a first data source and a second data source, where the first data source includes a first database of a first database technology hosted on a first computing node, and where the second data source includes a second database of a second database technology hosted on a second computing node; generating a query execution plan in response to the receiving the database query, where the generating includes performing the generating in dependence on prediction data returned responsively to applying model prompting data to a trained predictive model trained to predict computing resource availability of the first computing node and the second computing node; and executing the database query in according with the query execution plan.

Other embodiments of this aspect include corresponding computer systems, apparatus, and computer programs recorded on one or more computer storage devices, each configured to perform the actions of the methods. Implementations may include one or more of the following features. The computer implemented method where the predictive model has been trained with training data that includes availability data of a CPU of the first computing node, and availability data of a working memory of the first computing node. The query execution plan specifies that the first data source is disqualified from executing a split query of the database query. The query execution plan specifies that a query split of the database query is to be cached in the first computing resource. The query execution plan specifies that execution of the database query is to be delayed, and where the executing includes executing the database query after a delay. The first database is a relational database, and where the second database is an object database. The prediction data specifies that predicted working memory availability of the first computing node will satisfy an availability threshold, and where the method includes, based on the prediction data specifying that predicted working memory availability of the first computing node will satisfy the availability threshold, caching query split data of the database query in the first computing node. The prediction data specifies that predicted overall computing resource availability of the first computing node will not satisfy an overall computing resource availability threshold but that predicted working memory availability of the first computing node will satisfy a working memory availability threshold, and where the method includes, based on the prediction data specifying that the predicted overall computing resource availability of the first computing node will not satisfy the overall computing resource availability threshold but that the predicted working memory availability of the first computing node will satisfy a working memory availability threshold, caching query split data of the database query in the first computing node. The prediction data specifies that predicted overall computing resource availability of the first computing node will not satisfy an overall computing resource availability threshold and that predicted working memory availability of the first computing node will not satisfy a working memory availability threshold, and where the method includes, based on the prediction data specifying that the predicted overall computing resource availability of the first computing node will not satisfy the overall computing resource availability threshold and that the predicted working memory availability of the first computing node will not satisfy a working memory availability threshold, disqualifying the first data source from executing a split query of the database query. The prediction data specifies a predicted percentage of the plurality of data sources that will not satisfy an availability threshold, and where the method includes, in dependence on the predicted percentage of the plurality of data sources that will not satisfy an availability threshold, delaying execution of database query. The prediction data specifies a predicted percentage of the plurality of data sources that will not satisfy an availability threshold, and where the method includes, in dependence on the predicted percentage of the plurality of data sources that will not satisfy an availability threshold, delaying execution of database query, where the delaying includes scheduling the database query for execution at a predicted open time window. The prediction data specifies a predicted percentage of the plurality of data sources that will not satisfy an availability threshold, and where the method includes, in dependence on the predicted percentage of the plurality of data sources that will not satisfy an availability threshold, delaying execution of database query, where the delaying includes scheduling the database query for execution at a predicted open time window, where the predicted open time window has been determined by sending model prompting data to a plurality of instances of the trained predictive model, where respective ones of the instances have been trained with differentiated time granularities. The method includes monitoring performance of the plurality of data sources, selectively harvesting training data in dependence on the monitoring indicating a failure to satisfy a performance threshold and training a model to define the trained predictive model using the selectively harvested training data. The trained predictive model has been trained with training data that includes availability data of a CPU of the first computing node, and availability data of a working memory of the first computing node, where the first database is a relational database, and where the second database is an object database, where the method includes monitoring performance of the plurality of data sources, selectively harvesting training data in dependence on the monitoring indicating a failure to satisfy a performance threshold, and training a model to define the trained predictive model using the selectively harvested training data, where the prediction data specifies that predicted overall computing resource availability of the first computing node will not satisfy an overall computing resource availability threshold but that predicted working memory availability of the first computing node will satisfy a working memory availability threshold, and where the method includes, based on the prediction data specifying that the predicted overall computing resource availability of the first computing node will not satisfy the overall computing resource availability threshold but that the predicted working memory availability of the first computing node will satisfy a working memory availability threshold, caching query split data of the database query in the first computing node, where the prediction data specifies a predicted percentage of the plurality of data sources that will satisfy an availability threshold, and where the method includes, in dependence on the predicted percentage of the plurality of data sources that will satisfy an availability threshold, qualifying the database query for execution without delay. Implementations of the described techniques may include hardware, a method or process, or computer software on a computer-accessible medium. The system also includes a memory. The system also includes at least one processor in communication with the memory; and program instructions executable by one or more processor via the memory to perform a method may include: receiving, by a database management system, a database query, where the database management system is in communication with a plurality of data sources including a first data source and a second data source, where the first data source includes a first database of a first database technology hosted on a first computing node, and where the second data source includes a second database of a second database technology hosted on a second computing node; generating a query execution plan in response to the receiving the database query, where the generating includes performing the generating in dependence on prediction data returned responsively to applying model prompting data to a trained predictive model trained to predict computing resource availability of the first computing node and the second computing node; and executing the database query in according with the query execution plan.

Other embodiments of this aspect include corresponding computer systems, apparatus, and computer programs recorded on one or more computer storage devices, each configured to perform the actions of the methods. Implementations may include one or more of the following features. The system where the predictive model has been trained with training data that includes availability data of a CPU of the first computing node, and availability data of a working memory of the first computing node. The query execution plan specifies that the first data source is disqualified from executing a split query of the database query. The query execution plan specifies that a query split of the database query is to be cached in the first computing resource. The query execution plan specifies that execution of the database query is to be delayed, and where the executing includes executing the database query after a delay. Implementations of the described techniques may include hardware, a method or process, or computer software on a computer-accessible medium. One general aspect includes a computer readable storage medium readable by one or more processing circuit and storing instructions for execution by one or more processor for performing a method may include: receiving, by a database management system, a database query, where the database management system is in communication with a plurality of data sources including a first data source and a second data source, where the first data source includes a first database of a first database technology hosted on a first computing node, and where the second data source includes a second database of a second database technology hosted on a second computing node; generating a query execution plan in response to the receiving the database query, where the generating includes performing the generating in dependence on prediction data returned responsively to applying model prompting data to a trained predictive model trained to predict computing resource availability of the first computing node and the second computing node; and executing the database query in according with the query execution plan. Other embodiments of this aspect include corresponding computer systems, apparatus, and computer programs recorded on one or more computer storage devices, each configured to perform the actions of the methods.

In reference to FIG. 7 there is set forth a description of a computing environment 4100 that can include one or more computer 4101. In one example, a computing node as set forth herein can be provided in accordance with computer 4101 as set forth in FIG. 7.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present invention is described with reference to FIG. 7. In one aspect, a computing environment 4100 contains an example of an environment for the execution of at least some of the computer code involved in performing the inventive methods, such as code 4150 for performing database management processing as described with reference to FIGS. 1-6. In addition to block 4150, computing environment 4100 includes, for example, computer 4101, wide area network (WAN) 4102, end user device (EUD) 4103, remote server 4104, public cloud 4105, and private cloud 4106. In this embodiment, computer 4101 includes processor set 4110 (including processing circuitry 4120 and cache 4121), communication fabric 4111, volatile memory 4112, persistent storage 4113 (including operating system 4122 and block 4150, as identified above), peripheral device set 4114 (including user interface (UI) device set 4123, storage 4124, and Internet of Things (IoT) sensor set 4125), and network module 4115. Remote server 4104 includes remote database 4130. Public cloud 4105 includes gateway 4140, cloud orchestration module 4141, host physical machine set 4142, virtual machine set 4143, and container set 4144. IoT sensor set 4125, in one example, can include a Global Positioning Sensor (GPS) device, one or more of a camera, a gyroscope, a temperature sensor, a motion sensor, a humidity sensor, a pulse sensor, a blood pressure (bp) sensor or an audio input device.

Computer 4101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 4130. As is well understood in the art of computer technology, and depending upon the technology, performance of a computer-implemented method may be distributed among multiple computers and/ or between multiple locations. On the other hand, in this presentation of computing environment 4100, detailed discussion is focused on a single computer, specifically computer 4101, to keep the presentation as simple as possible. Computer 4101 may be located in a cloud, even though it is not shown in a cloud in FIG. 1. On the other hand, computer 4101 is not required to be in a cloud except to any extent as may be affirmatively indicated.

Processor set 4110 includes one, or more, computer processors of any type now known or to be developed in the future. Processing circuitry 4120 may be distributed over multiple packages, for example, multiple, coordinated integrated circuit chips. Processing circuitry 4120 may implement multiple processor threads and/or multiple processor cores. Cache 4121 is memory that is located in the processor chip package(s) and is typically used for data or code that should be available for rapid access by the threads or cores running on processor set 4110. Cache memories are typically organized into multiple levels depending upon relative proximity to the processing circuitry. Alternatively, some, or all, of the cache for the processor set may be located "off chip." In some computing environments, processor set 4110 may be designed for working with qubits and performing quantum computing.

Computer readable program instructions are typically loaded onto computer 4101 to cause a series of operational steps to be performed by processor set 4110 of computer 4101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 4121 and the other storage media discussed below. The program instructions, and associated data, are accessed by processor set 4110 to control and direct performance of the inventive methods. In computing environment 4100, at least some of the instructions for performing the inventive methods may be stored in block 4150 in persistent storage 4113.

Communication fabric 4111 is the signal conduction paths that allow the various components of computer 4101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 4112 is any type of volatile memory now known or to be developed in the future. Examples include dynamic type random access memory (RAM) or static type RAM. Typically, the volatile memory is characterized by random access, but this is not required unless affirmatively indicated. In computer 4101, the volatile memory 4112 is located in a single package and is internal to computer 4101, but, alternatively or additionally, the volatile memory may be distributed over multiple packages and/or located externally with respect to computer 4101.

Persistent storage 4113 is any form of non-volatile storage for computers that is now known or to be developed in the future. The non-volatility of this storage means that the stored data is maintained regardless of whether power is being supplied to computer 4101 and/or directly to persistent storage 4113. Persistent storage 4113 may be a read only memory (ROM), but typically at least a portion of the persistent storage allows writing of data, deletion of data and re-writing of data. Some familiar forms of persistent storage include magnetic disks and solid state storage devices. Operating system 4122 may take several forms, such as various known proprietary operating systems or open source. Portable Operating System Interface-type operating systems that employ a kernel. The code included in block 4150 typically includes at least some of the computer code involved in performing the inventive methods.

Peripheral device set 4114 includes the set of peripheral devices of computer 4101. Data communication connections between the peripheral devices and the other components of computer 4101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 4123 may include components such as a display screen, speaker, microphone, wearable devices (such as goggles and smart watches), keyboard, mouse, printer, touchpad, game controllers, and haptic devices. Storage 4124 is external storage, such as an external hard drive, or insertable storage, such as an SD card. Storage 4124 may be persistent and/or volatile. In some embodiments, storage 4124 may take the form of a quantum computing storage device for storing data in the form of qubits. In embodiments where computer 4101 is required to have a large amount of storage (for example, where computer 4101 locally stores and manages a large database) then this storage may be provided by peripheral storage devices designed for storing very large amounts of data, such as a storage area network (SAN) that is shared by multiple, geographically distributed computers. IoT sensor set 4125 is made up of sensors that can be used in Internet of Things applications. For example, one sensor may be a thermometer and another sensor may be a motion detector. A sensor of IoT sensor set 4125 can alternatively or in addition include, e.g., one or more of a camera, a gyroscope, a humidity sensor, a pulse sensor, a blood pressure (bp) sensor or an audio input device.

Network module 4115 is the collection of computer software, hardware, and firmware that allows computer 4101 to communicate with other computers through WAN 4102. Network module 4115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 4115 are performed on the same physical hardware device. In other embodiments (for example, embodiments that utilize software-defined networking (SDN)), the control functions and the forwarding functions of network module 4115 are performed on physically separate devices, such that the control functions manage several different network hardware devices. Computer readable program instructions for performing the inventive methods can typically be downloaded to computer 4101 from an external computer or external storage device through a network adapter card or network interface included in network module 4115.

WAN 4102 is any wide area network (for example, the internet) capable of communicating computer data over non-local distances by any technology for communicating computer data, now known or to be developed in the future. In some embodiments, the WAN 4102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 4103 is any computer system that is used and controlled by an end user (for example, a customer of an enterprise that operates computer 4101) and may take any of the forms discussed above in connection with computer 4101. EUD 4103 typically receives helpful and useful data from the operations of computer 4101. For example, in a hypothetical case where computer 4101 is designed to provide a recommendation to an end user, this recommendation would typically be communicated from network module 4115 of computer 4101 through WAN 4102 to EUD 4103. In this way, EUD 4103 can display, or otherwise present, the recommendation to an end user. In some embodiments, EUD 4103 may be a client device, such as thin client, heavy client, mainframe computer, desktop computer and so on.

Remote server 4104 is any computer system that serves at least some data and/or functionality to computer 4101. Remote server 4104 may be controlled and used by the same entity that operates computer 4101. Remote server 4104 represents the machine(s) that collect and store helpful and useful data for use by other computers, such as computer 4101. For example, in a hypothetical case where computer 4101 is designed and programmed to provide a recommendation based on historical data, then this historical data may be provided to computer 4101 from remote database 4130 of remote server 4104.

Public cloud 4105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 4105 is performed by the computer hardware and/or software of cloud orchestration module 4141. The computing resources provided by public cloud 4105 are typically implemented by virtual computing environments that run on various computers making up the computers of host physical machine set 4142, which is the universe of physical computers in and/or available to public cloud 4105. The virtual computing environments (VCEs) typically take the form of virtual machines from virtual machine set 4143 and/or containers from container set 4144. It is understood that these VCEs may be stored as images and may be transferred among and between the various physical machine hosts, either as images or after instantiation of the VCE. Cloud orchestration module 4141 manages the transfer and storage of images, deploys new instantiations of VCEs and manages active instantiations of VCE deployments. Gateway 4140 is the collection of computer software, hardware, and firmware that allows public cloud 4105 to communicate through WAN 4102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 4106 is similar to public cloud 4105, except that the computing resources are only available for use by a single enterprise. While private cloud 4106 is depicted as being in communication with WAN 4102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 4105 and private cloud 4106 are both part of a larger hybrid cloud.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements but is not limited to possessing only those one or more steps or elements. Likewise, a step of a method or an element of a device that "comprises," "has," "includes," or "contains" one or more features possesses those one or more features but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way but may also be configured in ways that are not listed.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
receiving, by a database management system, a database query, wherein the database management system is in communication with a plurality of data sources including a first data source and a second data source, wherein the first data source includes a first database of a first database technology hosted on a first computing node, and wherein the second data source includes a second database of a second database technology hosted on a second computing node;
generating a query execution plan in response to the receiving the database query, wherein the generating includes performing the generating in dependence on prediction data returned responsively to applying model prompting data to a trained predictive model trained to predict computing resource availability of the first computing node and the second computing node; and
executing the database query in according with the query execution plan.

2. The computer implemented method of claim 1, wherein the predictive model has been trained with training data that includes availability data of a CPU of the first computing node, and availability data of a working memory of the first computing node.

3. The computer implemented method of claim 1, wherein the query execution plan specifies that the first data source is disqualified from executing a split query of the database query.

4. The computer implemented method of claim 1, wherein the query execution plan specifies that a query split of the database query is to be cached in the first computing node.

5. The computer implemented method of claim 1, wherein the query execution plan specifies that execution of the database query is to be delayed, and wherein the executing includes executing the database query after a delay.

6. The computer implemented method of claim 1, wherein the first database is a relational database, and wherein the second database is an object database.

7. The computer implemented method of claim 1, wherein the prediction data specifies that predicted working memory availability of the first computing node will satisfy an availability threshold, and wherein the method includes, based on the prediction data specifying that predicted working memory availability of the first computing node will satisfy the availability threshold, caching query split data of the database query in the first computing node.

8. The computer implemented method of claim 1, wherein the prediction data specifies that predicted overall computing resource availability of the first computing node will not satisfy an overall computing resource availability threshold but that predicted working memory availability of the first computing node will satisfy a working memory availability threshold, and wherein the method includes, based on the prediction data specifying that the predicted overall computing resource availability of the first computing node will not satisfy the overall computing resource availability threshold but that the predicted working memory availability of the first computing node will satisfy a working memory availability threshold, caching query split data of the database query in the first computing node.

9. The computer implemented method of claim 1, wherein the prediction data specifies that predicted overall computing resource availability of the first computing node will not satisfy an overall computing resource availability threshold and that predicted working memory availability of the first computing node will not satisfy a working memory availability threshold, and wherein the method includes, based on the prediction data specifying that the predicted overall computing resource availability of the first computing node will not satisfy the overall computing resource availability threshold and that the predicted working memory availability of the first computing node will not satisfy a working memory availability threshold, disqualifying the first data source from executing a split query of the database query.

10. The computer implemented method of claim 1, wherein the prediction data specifies a predicted percentage of the plurality of data sources that will not satisfy an availability threshold, and wherein the method includes, in dependence on the predicted percentage of the plurality of data sources that will not satisfy an availability threshold, delaying execution of database query.

11. The computer implemented method of claim 1, wherein the prediction data specifies a predicted percentage of the plurality of data sources that will not satisfy an availability threshold, and wherein the method includes, in dependence on the predicted percentage of the plurality of data sources that will not satisfy an availability threshold, delaying execution of database query, wherein the delaying includes scheduling the database query for execution at a predicted open time window.

12. The computer implemented method of claim 1, wherein the prediction data specifies a predicted percentage of the plurality of data sources that will not satisfy an availability threshold, and wherein the method includes, in dependence on the predicted percentage of the plurality of data sources that will not satisfy an availability threshold, delaying execution of database query, wherein the delaying includes scheduling the database query for execution at a predicted open time window, wherein the predicted open time window has been determined by sending model prompting data to a plurality of instances of the trained predictive model, wherein respective ones of the instances have been trained with differentiated time granularities.

13. The computer implemented method of claim 1, wherein the method includes monitoring performance of the plurality of data sources, selectively harvesting training data in dependence on the monitoring indicating a failure to satisfy a performance threshold and training a model to define the trained predictive model using the selectively harvested training data.

14. The computer implemented method of claim 1, wherein the trained predictive model has been trained with training data that includes availability data of a CPU of the first computing node, and availability data of a working memory of the first computing node, wherein the first database is a relational database, and wherein the second database is an object database, wherein the method includes monitoring performance of the plurality of data sources, selectively harvesting training data in dependence on the monitoring indicating a failure to satisfy a performance threshold, and training a model to define the trained predictive model using the selectively harvested training data, wherein the prediction data specifies that predicted overall computing resource availability of the first computing node will not satisfy an overall computing resource availability threshold but that predicted working memory availability of the first computing node will satisfy a working memory availability threshold, and wherein the method includes, based on the prediction data specifying that the predicted overall computing resource availability of the first computing node will not satisfy the overall computing resource availability threshold but that the predicted working memory availability of the first computing node will satisfy a working memory availability threshold, caching query split data of the database query in the first computing node, wherein the prediction data specifies a predicted percentage of the plurality of data sources that will satisfy an availability threshold, and wherein the method includes, in dependence on the predicted percentage of the plurality of data sources that will satisfy an availability threshold, qualifying the database query for execution without delay.

15. The computer implemented method of claim 1, wherein the predictive model has been trained with training data that includes historical quantitative availability data specifying levels of computing resource availability.

16. The computer implemented method of claim 1, wherein the predictive model has been trained with training data that includes historical quantitative availability data specifying levels of computing resource availability, the historical quantitative availability data selected from the group consisting of CPU historical quantitative availability data and working memory historical quantitative availability data.

17. The computer implemented method of claim 1, wherein the prediction data specifies that predicted availability of a computing resource satisfies an availability threshold.

18. The computer implemented method of claim 1, wherein the prediction data specifies that a percentage of the plurality of data sources will not satisfy an availability threshold, and wherein the method includes delaying execution of the database query.

19. The computer implemented method of claim 1, wherein the method includes monitoring performance of the plurality of data sources, harvesting training data in dependence on the monitoring, and training the predictive model using the harvested training data.

20. A system comprising:

a memory;

at least one processor in communication with the memory; and program instructions executable by one or more processor via the memory to perform a method comprising:

receiving, by a database management system, a database query, wherein the database management system is in communication with a plurality of data sources including a first data source and a second data source, wherein the first data source includes a first database of a first database technology hosted on a first computing node, and wherein the second data source includes a second database of a second database technology hosted on a second computing node;

generating a query execution plan in response to the receiving the database query, wherein the generating includes performing the generating in dependence on prediction data returned responsively to applying model prompting data to a trained predictive model trained using historical quantitative resource availability data to predict computing resource availability of the first computing node and the second computing node; and executing the database query in according with the query execution plan.

* * * * *